May 2, 1961 M. L. EDWARDS 2,982,285
BALLISTO-CARDIOGRAPH TABLE
Filed May 27, 1957 2 Sheets-Sheet 1
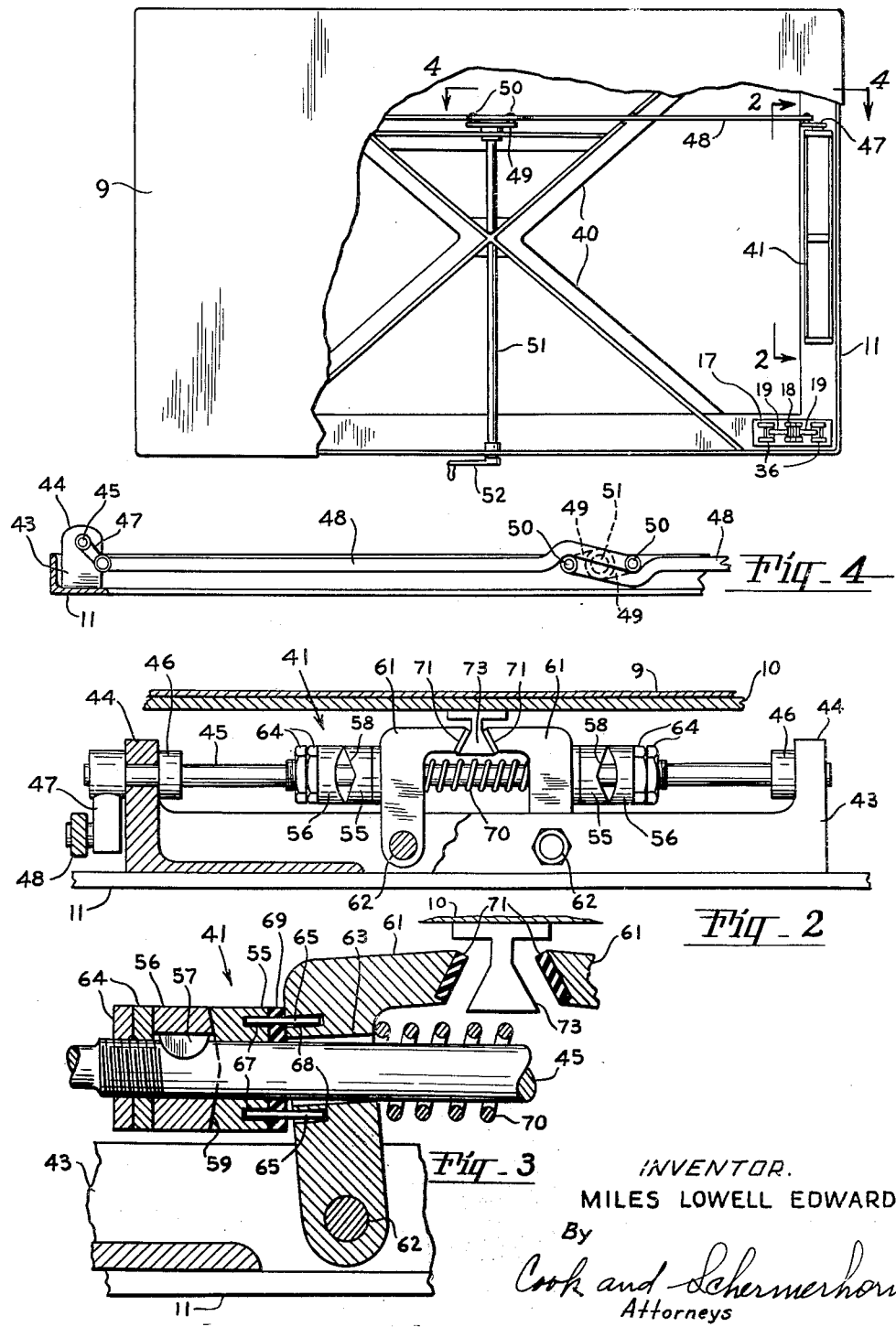
INVENTOR.
MILES LOWELL EDWARDS
By
Cook and Schermerhorn
Attorneys May 2, 1961     M. L. EDWARDS     2,982,285
BALLISTO-CARDIOGRAPH TABLE
Filed May 27, 1957     2 Sheets-Sheet 2
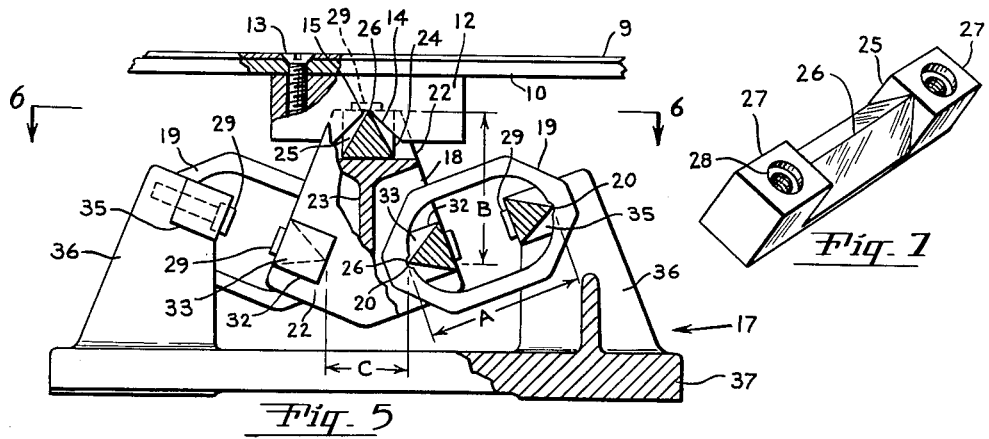
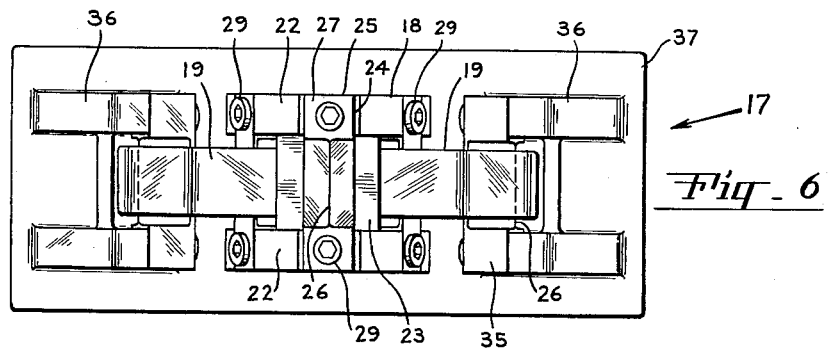
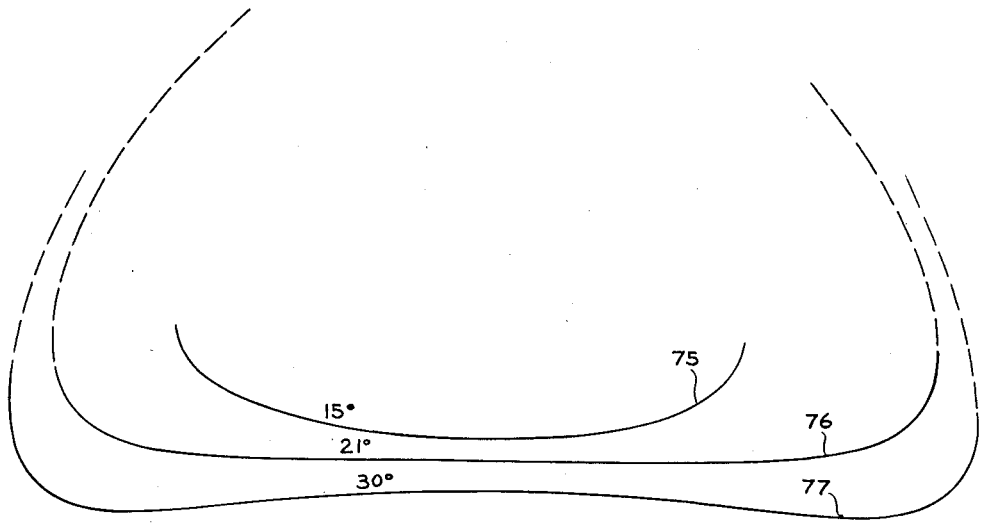
INVENTOR.
MILES LOWELL EDWARDS
BY
Cook and Schermerhorn
Attorneys United States Patent Office 2,982,285
Patented May 2, 1961

2,982,285

BALLISTO-CARDIOGRAPH TABLE

Miles Lowell Edwards, 13191 Sandhurst Place,
Santa Ana, Calif.

Filed May 27, 1957, Ser. No. 661,904

5 Claims. (Cl. 128—2.06)

This invention relates to an improved table for supporting a living body for measuring the ballistic effects in terms of body movement which are caused by the forces set up in the body by the muscles of the heart.

The table is used in connection with amplifying and recording apparatus capable of making an accurate graphic record on an enlarged scale of the body movements longitudinal to the body when lying on the table in a horizontal position.

In explanation, this problem may be reduced to a simple physical analogy by an example of two rigid bodies such as two blocks of wood of widely different weights connected together on a frictionless support. A rhythmic horizontal force acting between the two bodies causes a rhythmic motion to occur in each body with respect to the other. The center of gravity of the combined bodies is motionless, however.

According to a well-known law of physics, motion of each of the bodies is in a direction parallel to the direction of the rhythmic force, and the amount of movement of each is inversely proportional to the weight of the body—also the motions of the two bodies are opposite in direction.

When the human body is reclining in a horizontal position, the bones form a relatively rigid framework for the soft and semi-soft material that makes up the remainder of the body. The heart, located near but not exactly at the center of the body, by the action of its muscles causes a slight rhythmic re-distribution of weight in the body.

The re-distribution of weight is complex in nature. It may be said that the heart, being a displacement pump, ejects blood as it simultaneously reduces in size; therefore, the body weight re-distribution is solely due to the movement of blood in the arterial system.

This is not entirely true, however. The content of the chest cavity is composed of much soft material, which will shift minutely in position from slight pressures. When blood is ejected from the heart, an inflation of the system of large arteries near the heart causes a displacement of soft material in that region, from which there is no ballistic effect. For each quantity of blood ejected away from the heart, there is a compensating shift of soft material displaced by artery swelling to fill in for the reduction of the size of the heart.

The purpose of a ballisto-cardiograph table is to provide an almost frictionless support for the whole body and at the same time serve as an approximately rigid connection with the framework, tissue and arterial pipe lines to move freely therewith so that the combined center of gravity will remain substantially stationary as in theory. The movements of the table are thereby significantly and quantitatively related to the movements of the center of gravity of the mass of blood within the pipe lines and may be utilized as a measure of the effectiveness of the heart as a pump.

The desired characteristics of an ideal table support have not heretofore been attained in a practical form of apparatus. Various types of support have heretofore been proposed but a long pendulum support of low natural frequency is considered one of the best thus far achieved. Such a support, however, requires a ceiling height beyond that provided in conventional building construction and is otherwise objectionable because of cost, lack of portability and other considerations.

It is, therefore, the general object of the present invention to provide an improved suspension means for ballisto-cardiograph tables which is economical to build, compact in its space requirements, of high sensitivity, and rugged and reliable in its intended use.

Another object is to provide a novel compact mechanical equivalent of a long pendulum type of support having a low natural frequency of oscillation and low friction.

Another object is to so reduce the vertical space requirements of the suspension that a complete unit including table and suspension may be used on top of a conventional table or other base support as a portable unit.

Another object is to provide an improved locking device for a ballisto-cardiograph table of the type described.

The present suspension utilizes a novel link arrangement with knife-edge supports of very low friction. Although the link assemblies are quite compact, they may be built to reproduce the motion of a very long pendulum, within a limited range of movement which is ample for the purpose. By changing certain constants in the link geometry any pendulum motion from that of a short pendulum to that of a pendulum of infinite length may be obtained. The device may also be made to produce the motion of an inverted pendulum, if desired. Between the extremes mentioned, an equivalent pendulum length of about thirteen feet having a natural frequency of about fifteen cycles per minute when loaded with a patient of average weight is considered preferable.

In order to trace a ballisto-cardiogram, the table is operatively connected with suitable amplifying and recording equipment. For this portion of the apparatus, which is not illustrated herein, reference is made to my prior patent, No. 2,680,438, issued June 8, 1954, for Ballistic Cardiograph. A suitable table connector, clutch, centering device and calibrating device are therein disclosed which may be employed to advantage with the present table. The present invention is not to be limited by the disclosure in my prior patent, however, as other amplifying and recording instruments may be used.

The invention will be better understood and additional objects and advantages will become apparent from the following description taken in connection with the accompanying drawings which illustrate a preferred form of the invention. It is to be understood, however, that the invention may take other forms, and that all such modifications and variations within the scope of the appended claims which will occur to persons skilled in the art are included in the invention.

In the drawings:

Figure 1 is a top plan view of the present ballisto-cardiograph table with a portion thereof broken away;

Figure 2 is an elevational view with parts in section taken on the line 2—2 of Figure 1 and showing a locking device for locking a table frame to a base frame therefor, the parts being shown in locked position;

Figure 3 is an enlarged fragmentary sectional view of the locking device in released position;

Figure 4 is an elevational view on the line 4—4 of Figure 1 with parts in section showing operating structure for the locking device;

Figure 5 is an elevational view of a link suspension assembly for the table, with parts broken away;

Figure 6 is a top plan view of the link suspension assembly, taken on the line 6—6 of Figure 5;

Figure 7 is a perspective view of a knife edge bearing member utilized in the link assembly; and Figure 8 is a graph on greatly enlarged scale showing different curves which can be traced to illustrate the paths of movement of the table upon changing certain constants in the geometry of the link assembly.

The ballisto-cardiograph table of the present invention is shown in Figure 1, and comprises, principally, a rectangular patient-supporting panel 9 secured to a table frame 10, and a flat base frame 11 upon which the panel 10 is supported. Panel 9 and frame 10 are formed of rigid but light weight materials, having a small combined mass relative to the mass of the patient supported thereon so as to be freely movable therewith as the patient's body responds to ballistic effects produced by the pumping action of his heart. The under side of the frame 10 adjacent its four corners is equipped with bearing blocks 12, Figure 5, held securely in place by screws 13. These blocks have transverse, V-shaped grooves 14 in their bottom surface terminating in a rounded shallow groove 15.

The frame 10 is suspended above the base frame 11 by compact link assemblies 17 comprising a central upright floating link 18 of inverted T shape, Figures 5 and 6, and a pair of inclined elliptical connecting links 19, each having transverse, shallow grooves 20 at opposite ends of its inner surface. Link 18 has a pair of end walls 22 between which extends a reinforcing rib 23 of upright T shape. End walls 22 are notched from the top at 24 for receiving a triangular bearing member 25, Figure 7, these notches terminating flush with the top of rib 23 wherein the bearing member is supported intermediate its ends by this rib. Bearing member 25 has an upturned knife edge 26 and square end portions 27 provided with apertures 28 for receiving cap screws 29 threadedly mounted in suitable tapped bores at the bottom of notches 24 in the end walls 22.

The link 18 has inclined side edges on its end walls 22 which are notched at 32 adjacent the bottom for receiving a pair of bearing members 33 of the same structure as the bearing member 25, having inwardly directed knife edges 26 and being secured to said link by cap screws 29 in the bottoms of notches 32.

The grooves 20 at the lower, adjacent ends of the links 19 engage the knife edges 26 of the bearing members 33 and the grooves 20 at the upper, remote ends of the links 19 engage knife edges 26 of bearing members designated by the numerals 35. Bearing members 35 are similar in structure to the members 25 and 33 and are supported in a fixed position by cap screws 29 on stationary upstanding lugs 36 on a base member 37 secured to the base frame 11. End links 19 thus suspend the center link 18 freely in floating relation, and all pivotal connecting points of suspension between the base frame and the patient-supporting panel are knife edges which reduce to a minimum the frictional retarding forces which tend to resist the oscillation of the said panel relative to the base frame.

Base frame 11 has diagonal reinforcing members 40, Figure 1, and carries a locking device 41 at each end for locking the patient supporting table frame 10 and the base frame together as an integral unit when the patient is moving onto or off the panel. Each of the two locking devices 41 comprises a channel-shaped base member 43 having upwardly extended end walls 44 in which is journaled a shaft 45. Shaft 45 has collars 46 fixed thereto adjacent the inner surfaces of end walls 44 to prevent axial movement of the shaft. Secured to one end of the shaft 45 exteriorly of the base member 13 is a crank arm 47 pivotally connected to a link 48, in turn connected to a crank arm 49 by a pivot pin 50. Crank arm 49 is keyed to a transverse shaft 51 having a crank handle 52 by means of which the crank arm 49 is rotatable for locking and releasing the locking devices. The linkage arrangement illustrated is such that a partial turn of the shaft 51 produces a quarter turn of the two shafts 45. There are two oppositely directed crank arms 49, each connected as described to one of the links 48.

Secured to each shaft 45 intermediate the end walls 44 of the base member 43 are two sets of cams each comprising an inner cam 55 loosely mounted on the shaft and an outer cam 56 keyed to said shaft by key 57. Cams 55 have two diametrically opposite V-shaped depressions 58 and the cams 56 have two correspondingly shaped projections 59, whereby, upon rotation of the shaft 45 through 90 degrees from the position in which the faces of the cams are in interfitting registry, the tips of the cams 56 ride over the peripheral edges of the faces of cams 55 to slide the latter cams on the shaft toward each other. Between the sets of cams on the shaft are disposed a pair of jaw members 61 pivotally mounted at their lower ends by pins 62 to the base member 43.

These jaw members have apertures 63, Figure 3, which receive the shaft and which are larger than the diameter of the shaft to permit the jaws to rock through a small arc on the shaft. The two sets of cams are held in adjustable spaced relation axially of the shaft by sets of nuts 64 threaded on the shaft 45, and cams 55 are held in a non-rotative position, by pins 65 extending between registering apertures 67 and 68 in the cams and the jaws, respectively. The apertures 67 and 68 in the cam and jaws for receiving the pins 65, similar to the apertures 63, are sufficiently large to provide a loose fit between these parts so that said jaws can rotate slightly when moving between locking and released positions, or vice versa. A rubber cushion washer 69 on the shaft 45 is disposed between the inner cams 55 and their respective jaws, and the two jaws are urged apart toward open or unclamped position by a spring 70 on the shaft which is compressed between the two jaws.

The tips of jaws 61 are provided with resilient friction pads 71 adapted to engage a triangular lug 73 secured to the under side of the table frame 10, the lower portion of the lug 73 being tapered outwardly and the tips of the jaws 61 being inclined inwardly to fit this taper so that when the jaws are clamped against the lug 73 there can be no upward movement of the table frame 10. The locking devices are closed when the patient moves on or off the table by rotation of crank 52, and as the clamping devices prevent relative vertical movement between the panel and base frame as described, there will be no twisting forces applied to the corner link assemblies and, consequently, no damage to the knife edge bearings or displacement of these bearings from their seats. The direction of normal oscillation of the table frame in use is longitudinal, which is perpendicular to the plane of the views in Figures 2 and 3. The two links 48 are offset as shown in Figure 4 to allow the two opposite crank arms 49 to lock in over-center positions when jaws 61 are clamped on lugs 73.

The panel 10 is operatively connected with suitable amplifying and recording equipment of the type hereinbefore mentioned, and, with a patient lying on the panel and the locking devices released, the ballistic effects acting longitudinally of the table produced by pulsations of the heart are accurately recorded to give a true indication of blood flow and heart action. As stated before, an equivalent pendulum length of about thirteen feet having a natural frequency of about 15 cycles per minute with a patient of average weight is preferred and such motion can be accomplished by the linkage assembly, shown in Figure 5, by using proper dimensions and angular relationships.

Referring now to Figure 8, three curves 75, 76 and 77 are shown in enlarged scale for illustration purposes. The central portion of curve 76 corresponds to the arc of a pendulum having a thirteen foot supporting rod and with the proper link geometry, to be described, the upper knife edge 26 of center link 18 will follow such a path. In other words, the present link assemblies are capable of reproducing a portion of the arcuate path of a thirteen-foot pendulum. Other curves 75 and 77 represent the path of the upper knife edge when the constants of the link geometry have different values, although it is to be understood that these two curves are not necessarily desired paths for the table but merely show the possibilities of wide variation obtainable with the link assembly structure disclosed.

The curve 76 arises abruptly at its ends, and, if completed, would form a closed loop. The lower central portion, which comprises the path of motion desired, has a slight downward curvature of approximately thirteen feet radius at true scale in the actual device. The necessary excursion length of oscillation of the patient-supporting panel 9 is only a very small fraction of an inch, and the present linkage arrangement provides sufficient movement of the panel in the desired arc to accommodate the longitudinal oscillations set up by the ballistic effects produced by the heart without approaching the upturned ends of the curve.

In view of the shape of the curve followed by the table within its range of oscillation when the linkage is designed to produce the curve 76, it is apparent that the assembly is self-centering and it is, therefore, not necessary to provide separate dampening means, or means for applying a restoring force to the panel. A combined dampening and self-centering effect is produced by gravity as the links are moved to either side of their stable center position. The natural frequency of oscillation of the panel is well below the range of heart beat frequencies and, therefore, objectionable resonance conditions are eliminated.

To obtain the preferred path of movement illustrated by the curve 76, the following link dimensions or values proportional thereto are used: 1.250 inches across the opening of each link 19, designated by the letter A; 1.155 inches vertically between the upper knife edge of the link 18 and its two lower knife edges, designated by the letter B; and .625 inch horizontal distance between the latter two knife edges, designated by the letter C. Also, in addition to these dimensions, the horizontal spacing of bearing members 35 is made of such value that the longitudinal axes of the two links 19 between their bearing points 20 are inclined 21° from the horizontal. Thus, the supporting bearings 35 are disposed below the bottom of table frame 10 and the whole link assembly forms a compact unit which does not elevate the panel 9 more than about two inches from base frame 11.

Negligible retarding frictional forces exist in the knife edges of the bearing members 25 to form a ballistocardiograph of high sensitivity whereby the minute longitudinal movements of the panel horizontally are accurately related to the longitudinal resultant of the movements of the whole mass of blood in the patient's body to produce substantially a true graphic record of said movements. Because of the light weight of panel 9 and table frame 10 in relation to the weight of the patient, the table frame floats freely on the link assemblies as a part of the patient's body without any appreciable relative movement between the patient's body and the panel which would decrease the accuracy of the graphic record produced.

Figure 8 illustrates the wide variation in the type of pendulum motion which may be obtained through the use of different constants in the link geometry of the suspension assemblies. Curve 75 is produced by reducing the inclination of end links 19 to 15° from the horizontal. The central portion of this curve has considerable curvature, corresponding to the path of motion of a short pendulum. Such a linkage angle is not desirable for the present purpose as it would impart a higher natural frequency to the table, possibly falling within or close to the range of heart beat frequencies of the patients using the apparatus.

Curve 77, on the other hand, is produced by increasing the inclination of end links 19 to 30° from the horizontal. The central portion of this curve is reversed, bending upward in general correspondence to the path of motion of an inverted pendulum. Inverted pendulum supports have heretofore been proposed for ballistic cardiograph tables but the structures have been heavy and cumbersome. The present linkage suspension provides a greatly improved apparatus for the purpose whenever an inverted pendulum support may be desired.

By using a still different inclination for end links 19 very slightly in excess of 21°, a curve may be obtained having a flat central portion corresponding to the path of movement of a pendulum of infinite length. Where straight line motion is desired without any inherent restoring force to produce a centering action, the present linkage thus arranged provides a table suspension with less friction in very small amplitudes of oscillation than any other known supporting means such as ball bearings, wheels or pneumatic cushions.

The curves of Figure 8 may be altered further by changing the relationships existing between the dimensions A, B and C. The dimensional and angular relationships described in connection with Figure 5 are preferred, however, in order to reproduce the movement of a thirteen-foot pendulum as illustrated by the curve 76 in Figure 8.

An important feature of the present construction is the compactness of the entire unit comprising the table frame and the supporting base frame. For purposes of illustration, Figure 5 is drawn substantially to full scale and shows the over-all height of the unit in relation to the given dimensions. This unit is portable and self-contained and may be supported on existing flat surfaces such as tables or the like. It does not consume valuable clinic or hospital space when it is not in use and yet reproduces the motion of a long pendulum.

Having now described my invention and in what manner the same may be used, what I claim as new and desire to protect by Letters Patent is:

1. In a ballistic cardiograph, a stationary base member, a rigid patient-supporting member disposed above said base member, link assemblies pivotally connected between said base member and said patient-supporting member for directing oscillating movement of said latter member on a pendulous path, a pair of jaws pivotally mounted on one of said members, a vertically disposed jaw engaging lug on said other member, said lug having tapered jaw engaging portions, cam means for moving said jaws into and out of engagement with said lug, and a crank shaft operatively connected to said cam means for locking said two members together as an integral unit.

2. In a ballistic cardiograph table, a stationary base member, a rigid patient-supporting member disposed above said base member, link assemblies pivotally connected between said base member and said patient-supporting member for directing oscillating movement of said latter member on a pendulous path, a pair of jaws at opposite ends of said table pivotally mounted on one of said members, vertically disposed jaw engaging lugs on said other member having tapered jaw engaging portions, cam means for moving said jaws into and out of engagement with said lugs, a crank shaft, and connecting means between said crank shaft and said cam means for locking and unlocking said jaws simultaneously upon rotation of said shaft.

3. In a ballistic cardiograph, a stationary elongated base member, a rigid horizontal patient supporting member disposed above said base member, link assemblies pivotally connected between said members suspending said patient supporting member for longitudinal oscillating movement, a wedge-shaped lug on one of said members having a pair of inclined longitudinally extending wedge faces convergent toward said one member, a pair of clamp jaws on said other member engageable with said wedge faces to prevent said oscillating movement and to prevent uplift of said patient supporting member, and means for clamping and unclamping said jaws.

4. A compact ballistic cardiograph table unit comprising a flat base frame adapted to rest on a table, a rigid patient supporting member, and a plurality of short link assemblies suspending said member in closely spaced relation above said base frame for oscillatory movement of minute amplitude, each of said link assemblies comprising a center link pivotally connected between a pair of end links, said end links being divergent upwardly from said center link at angles of approximately 21° from horizontal, means on said frame pivotally supporting the upper ends of said end links, upstanding means on said center link pivotally supporting said member, all of said pivotal supporting means and pivotal connections having knife edge bearing parts, said link assemblies constraining said member to a pendulous path of movement within said minute amplitude of oscillation corresponding to the motion of a long pendulum having a length vastly exceeding the length of said links, and releasable clamp means on opposite ends of said base frame and patient supporting member arranged to prevent said oscillatory movement and also to prevent uplift of said member relative to said base frame.

5. A compact ballistic cardiograph table unit comprising a base frame, a rigid patient supporting member, and a plurality of short link assemblies suspending said member above said base frame for oscillatory movement of minute amplitude, each of said link assemblies comprising a center link pivotally connected between a pair of end links, said end links being divergent upwardly from said center link at angles of approximately 21° from horizontal, an upper bearing on said center link having pivotal engagement with said member, a pair of lower bearings on said center link having pivotal engagement with the lower ends of said end links, and a pair of bearings on said frame having pivotal engagement with the upper ends of said end links, each end link having a length A between said lower bearing on said center link and said bearing on said frame, said upper bearing on said center link being a vertical distance B above said lower bearings on said center link, and said lower bearings on said center link being spaced apart horizontally a distance C, the dimensional values of A, B and C being approximately proportional to 1.25, 1.155 and 0.625, respectively, to produce the motion of a pendulum approximately 13 feet long in said member within said minute amplitude of oscillation.

References Cited in the file of this patent

UNITED STATES PATENTS

| | | |
|---|---|---|
| 929,207 | Gerlach | July 27, 1909 |
| 993,701 | Messiter | May 30, 1911 |
| 1,553,503 | Brown | Sept. 15, 1925 |
| 1,650,178 | Atkinson | Nov. 22, 1927 |
| 2,014,277 | Bousfield | Sept. 10, 1935 |
| 2,256,004 | Thomas | Sept. 16, 1941 |
| 2,433,548 | Ecks | Dec. 30, 1947 |
| 2,680,438 | Edwards | June 8, 1954 |

OTHER REFERENCES

Nickerson et al.: American Journal of Physiology, 128–2.06, vol. 142, Aug. 1, 1944, pages 1–11. (Copy in Scientific Library.)